United States Patent [19]
Straw et al.

[11] 3,940,301
[45] Feb. 24, 1976

[54] METHOD OF MANUFACTURING AN OPEN CELLULAR ARTICLE

[75] Inventors: Raymond L. Straw, Peoria; Larry R. Wilson, Mossville, both of Ill.

[73] Assignee: Caterpillar Tractor Co., Peoria, Ill.

[22] Filed: Aug. 1, 1974

[21] Appl. No.: 493,755

[52] U.S. Cl. ............... 156/155; 65/23; 65/42; 156/89; 156/242; 156/294; 156/296; 156/306; 156/311; 165/166; 264/44; 264/58; 264/59; 264/63; 264/66; 264/125; 264/313; 264/DIG. 44
[51] Int. Cl.² ............................. B32B 31/20
[58] Field of Search ............ 156/312, 327, 338, 89, 156/155, 242, 288, 293, 294, 296, 304, 306, 308, 311; 264/56, 57, 58, 59, 60, 63, 66, 317, 125, 126, 313, DIG. 36, DIG. 44; 65/33, 36, 42, 23; 165/139, 166

[56] References Cited
UNITED STATES PATENTS

| | | | |
|---|---|---|---|
| 2,506,244 | 5/1950 | Stopka | 264/59 |
| 3,345,160 | 10/1967 | Miccioli | 264/59 |
| 3,467,745 | 9/1969 | Lambertson et al. | 264/317 |
| 3,473,987 | 10/1969 | Sowards | 264/59 |
| 3,491,184 | 1/1970 | Rietdijk | 264/317 |
| 3,502,596 | 3/1970 | Sowards | 264/59 |
| 3,534,131 | 10/1970 | Gebler et al. | 264/59 |
| 3,702,771 | 10/1972 | Brown et al. | 264/63 |
| 3,794,707 | 2/1974 | O'Neill | 264/63 |

*Primary Examiner*—Edward G. Whitby
*Attorney, Agent, or Firm*—Ralph E. Walters

[57] ABSTRACT

A method of manufacturing an open cellular article constructed of a plurality of spaced walls of relatively weak bondable material defining a plurality of elongated passages therethrough which are filled with a disintegratable filler material having sufficient form and strength initially to maintain the walls in their predetermined precisely spaced relation and after bonding of the walls into an integral unit such filler material being conveniently removable from the article to reestablish the passages between the walls.

15 Claims, 3 Drawing Figures

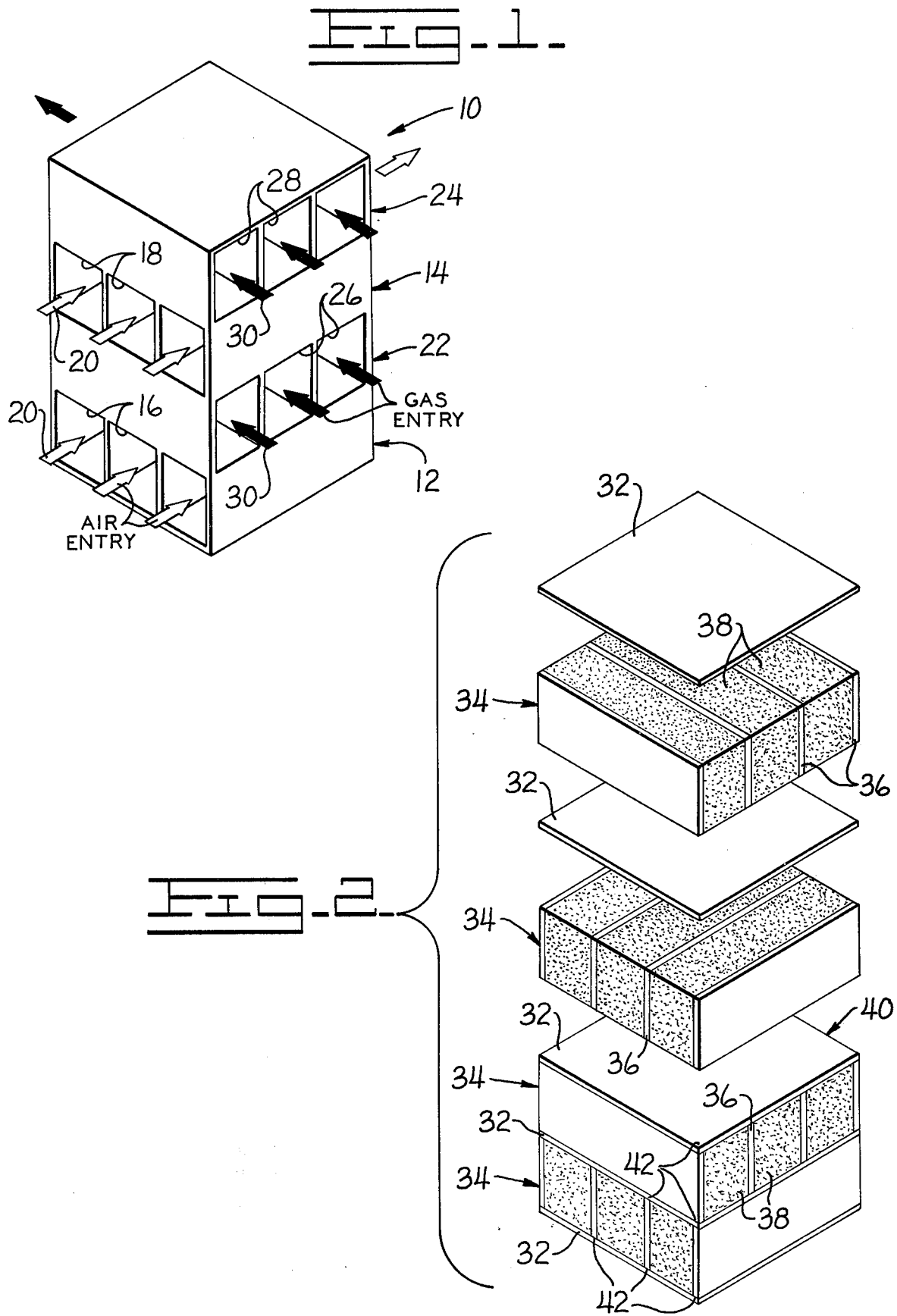

METHOD OF MANUFACTURING AN OPEN CELLULAR ARTICLE

BACKGROUND OF THE INVENTION

A great deal of effort is being devoted to the development of ceramic heat exchangers using the general assembly method of alternately stacking or winding relatively thin flat sheets with corrugated, ribbed or otherwise profiled plates and then subjecting this unfired or green structure to a high firing temperature for hardening. With such heat exchangers, it is desirable to minimize wall thickness to permit greater heat exchanger effectiveness and better use of materials. However, when this is done handling of the relatively weak, green pieces becomes a major problem. Specifically, the green structure tends to sag or deform prior to the firing and hardening procedure which results in undesirable non-uniform passages therethrough.

Ceramic heat exchangers are currently being made by utilizing reaction bonding or sintering techniques to harden a mixture of ceramic powders and binding ingredients. Unfortunately with these techniques the binding ingredients burn out during the initial heating stages leaving open pores which later must be sealed to produce a heat exchanger without internal leakage. This is an expensive processing step, and, therefore, various attempts are being made to increase the final density of the fired ceramic walls to avoid such a porous structure. For example, the density of the thin walls could be increased by subjecting the stacked sheets and profiled plates to pressure prior to the final firing stage. However, such pressure tends to further distort the alternate layers and block the passages therethrough as set forth above. To avoid this, and as an alternate to firing the green ceramic stack of alternate sheets and plates into a monolithic block, the sheets and plates may be individually fired and hardened and thereafter be stacked and bonded together. But here also an entirely new set of complex problems are created, involving the effective bonding of the parts together to avoid cracking and leakage of the heat exchanger with extended service.

Exemplifying the improvements being made in the ceramic heat exchanger field are the following U.S. Pat. Nos.:

2,552,937 to H. Cohen
3,081,822 to J. Wolansky et al.
3,112,184 to R. Z. Hollenbach
3,444,925 to J. R. Johnson One of the ceramic materials being actively considered for such heat exchangers is silicon nitride. Some of the properties and advantages of this material are set forth in British Patent No. 970,639 to G. G. Deeley, published Sept. 23, 1964; British Patent No. 1,092,637 to R. F. Coe, published Nov. 29, 1967; and British Patent No. 1,266,506 to E. R. W. May, published Mar. 8, 1972.

SUMMARY AND OBJECTS OF THE INVENTION

It is therefore an object of the present invention to provide an improved method of manufacturing an open cellular ceramic article having accurately delineated internal passages and relatively thin, impermeable walls.

Another object of the invention is to provide such an improved method of manufacturing an integrally formed open cellular ceramic article wherein the tendency of the article walls to sag prior to the firing and hardening stage is substantially avoided.

Another object of the invention is to provide an improved method of manufacturing an open cellular ceramic article having the characteristics set forth above which is particularly suitable for making a ceramic heat exchanger.

Other objects and advantages of the present invention will become more readily apparent upon reference to the accompanying drawings and the following description.

BRIEF DESCRIPTION OF THE DRAWING

FIG. 1 is a perspective view of an integrally formed ceramic cross-flow heat exchanger manufactured by the method of the present invention.

FIG. 2 is a partially exploded view of a plurality of wall members and passage-forming support members prior to completion of their assembly during the manufacture of the heat exchanger of FIG. 1 in accordance with the method of the present invention.

DESCRIPTION OF THE PREFERRED EMBODIMENT

Figure 3:
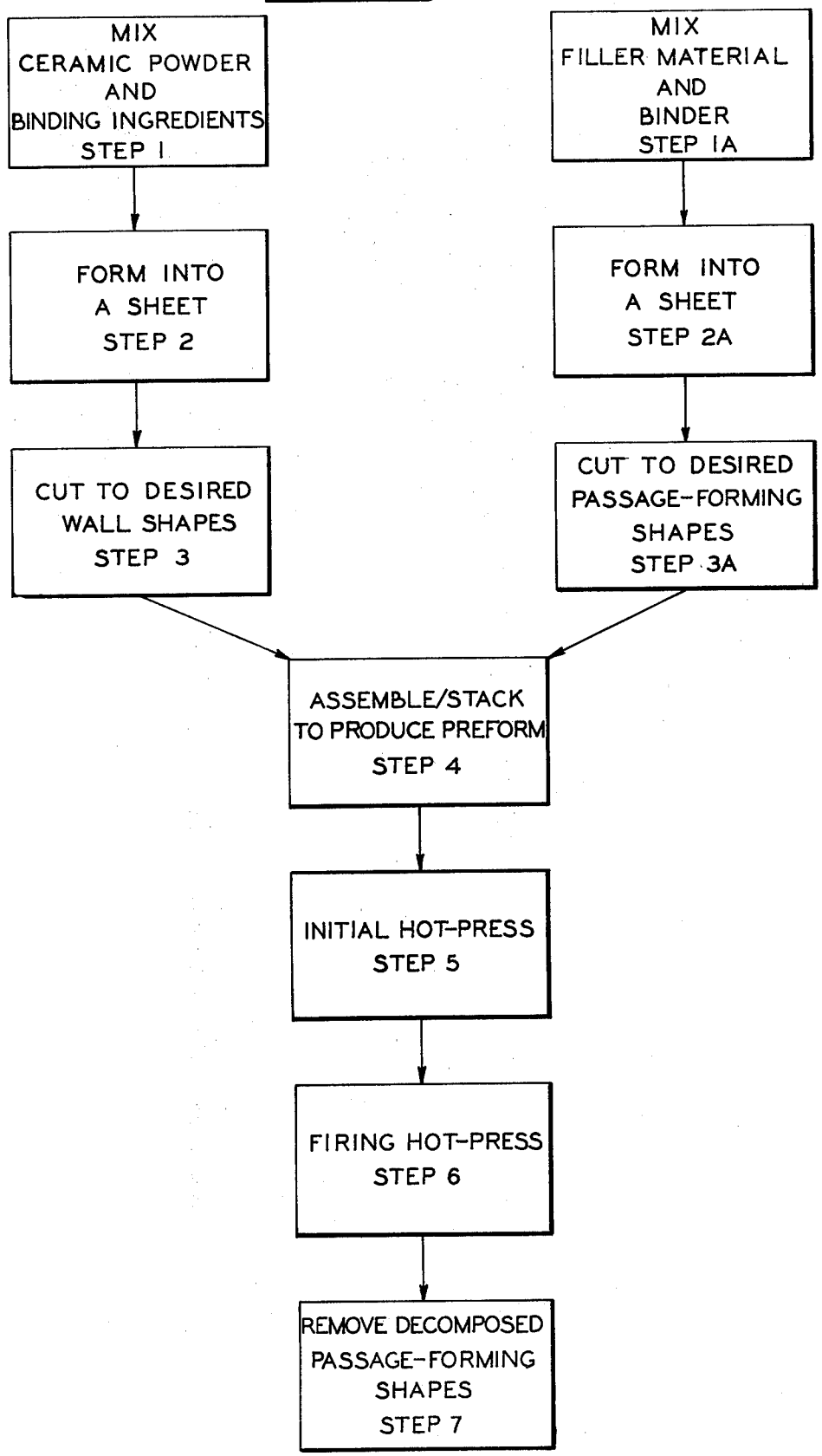
FIG. 3 is a block flow diagram of the preferred method of manufacturing a ceramic open cellular article in accordance with the present invention.

With reference to FIG. 1, a ceramic open cellular article, such as a monolithically formed ceramic heat exchanger 10, is effectively produced by the improved manufacturing method of the present invention. The ceramic heat exchanger 10, which is considerably enlarged and schematically simplified for illustrative convenience, includes first and third substantially similar layers respectively identified generally by the numerals 12 and 14. The layers individually provide a plurality of corresponding elongated openings or passages 16 and 18 through which a flow of air is adapted to be directed as shown by a plurality of open arrows 20. The heat exchanger further includes second and fourth layers 22 and 24, respectively, which individually define a plurality of elongated openings or passages 26 and 28 through which a flow of gas is directed as represented by the closed or solid arrows 30. The substantially right angle relationship between these air flow and gas flow passages thus defines a cross flow type of heat exchanger wherein the relatively hot gas flow 30 transmits heat to the relatively cool air flow 20 prior to the delivery of the heated air to an associated engine or the like, not shown, in order to improve the efficiency thereof in the usual manner.

In accordance with the present invention, the ceramic heat exchanger 10 of FIG. 1 is preferably manufactured by alternately stacking five wall-forming separator sheets or wall members 32 with four sandwich sections 34 as shown in FIG. 2. Such sections individually include four wall-forming partitioning ribs or wall members 36 and three passage-forming or wall support members 38. The wall members 32 and 36 are made from relatively thin sheets of a relatively weak bondable material approximately 0.015 inch thick. Such bondable material is preferably composed of a ceramic based mixture of ceramic particles selected from the group consisting of refractory nitrides, refractory carbides and refractory oxides with a quantity of binding ingredients. Such refractory compositions have relatively high melting points, and suitable metals therefore include Beryllium, Boron, Magnesium, Aluminum, Silicon, Titanium, Chromium, Zirconium, Niobium, Hafnium, Tantalum and Tungsten. More specifically the ceramic based mixture is preferably composed of a blend of relatively high alpha phase silicon nitride powder, a relatively small proportion of a catalyst such as magnesium oxide powder, and a plurality of cohesive binding ingredients including primarily elastomeric materials such as ethylene propylene diene modified (EPDM) rubber. The EPDM rubber is preferably blended at a 45 percent volumetric ratio with the 55 percent silicon nitride and magnesium oxide powder mix. On the other hand, the support members 38 are made from thicker sheets of a disintegratable filler material, which is preferably composed of a mixture of graphite powder with a cohesive binder, such as the aforementioned EPDM rubber. The preferred volumetric ratio blend for the disintegratable filler material mixture is 45 percent EPDM rubber with 55 percent graphite powder.

The wall members 32 and 36 of relatively weak bondable material and the passage-forming support members 38 of disintegratable filler material are assembled into a closely associated, relatively solid structure partially represented by a preform 40 shown at the lower portion of FIG. 2 and forming approximately half of the full structure necessary to produce the heat exchanger 10 of FIG. 1. In this manner, a plurality of joints 42 are provided by the relatively limited edgeward and substantially line contact between the sheets 32 and ribs 36 forming the wall members. Thus, the relatively weak, limitedly contacting wall members are held in a predetermined fixed spacial relationship to each other by the bracing support members 38 to provide a substantially solid preform. These support members are subsequently removed and form no part of the monolithically formed and hardened ceramic heat exchanger 10.

Therefore, the present invention utilizes a removable or disintegratable filler material in the form of the passage-forming support members 38 to brace the relatively weak wall members 32 and 36, which have poor strength in such thin sheets when made of a so-called "green" or unfired ceramic mixture. This improvement enables the structure to be handled and subjected to a multiplicity of heating and hardening operations with minimal chance of uncontrolled distortion or internal drooping of the wall members thereof.

The fully assembled preform 40 is preferably inserted into a substantially enclosed vessel, not shown, such as a graphite die with a case having one or more surfaces movable to compress the preform therebetween in the usual manner. Reference is made to the induction heating of a graphite die as set forth in an article entitled "The Influence of Some Process Variables on the Mechanical Properties of Hot-Pressed Silicon Nitride" by Messrs. R. T. Lumby and R. F. Coe on pages 91 through 101 of the British Ceramic Society Proceedings (1970, V15). The preform is closely encased by the vessel and utilizes a relatively thin separating barrier of the previously described filler material of approximately 0.020 inch thick which is disposed therebetween in place of the spray-coated boron nitride layer applied to specimens in the aforementioned article. Such separating barrier beneficially promotes free sliding movement between the vessel and the preform in order to avoid any damage to the wall members 32 and 36. The preform is then subjected to both heat and pressure, and in marked contrast to prior art structures, pressurizing the preform of the present invention will not deform the wall members, but will allow substantial uniform densification thereof in a predetermined manner. During heating of the preform the support members 38, and particularly the EPDM rubber binder thereof, decompose and a portion thereof is allowed to escape the vessel between the case and its movable surface portion as the temperature is initially raised beyond the volatilization point of the binder. Nevertheless, the remainder of the decomposed support members continues to brace the wall members as the subsequent hot pressing continues to unify and densify the silicon nitride powder making up the wall members. The fired monolithic heat exchanger 10 with relatively strong, non-porous walls is thereafter removed from the depressurized and cooled vessel and subjected to final cleaning to remove the remainder of the decomposed support members to provide the accurately delineated internal air flow passages 16 and 18, and gas flow passages 26 and 28.

OPERATION

While the method of manufacturing a ceramic open cellular article 10, as taught by the present invention, is believed clearly apparent from the foregoing description, further amplification will subsequently be made in the following brief summary of such operation. The separator sheets 32 and the ribs 36 forming the wall members of the ceramic heat exchanger 10 are made into sheets by mixing the aforementioned ceramic powder blend of silicon nitride powder and magnesium oxide powder, with suitable binding ingredients including the EPDM rubber as set forth in the block identified as step 1 in FIG. 3. EPDM rubber has been found particularly desirable because of its ability to blend well with the ceramic powder in a rubber mill, and because of its organic nature which allows it to be burned out during the initial heating stages.

After mixing, the ceramic based mixture is rolled or otherwise formed, as indicated in step 2 of FIG. 3, to a predetermined thickness which allows for subsequent densification and shrinkage. This provides a relatively flexible weak bondable material sheet that is then cut to the desired wall shapes as indicated in step 3.

Similarly, the passage-forming support members 38 of the present invention are manufactured by initially mixing the aforementioned graphite powder filler with the EPDM rubber binder as shown in the block identified as step 1A in FIG. 3. This expendable mixture is, likewise, rolled or otherwise formed into somewhat thicker sheets with allowance for densification and shrinkage as indicated in step 2A. The physical properties of these disintegratable material sheets should be such that a minimal chemical reaction will result with the ceramic mixture of the wall members 32 and 36 during heating, and will subsequently be removable. Alternately, carbon and boron nitride powders are suitable as relatively inert powder filler materials. These sheets are also cut to the desired passage-forming shapes as indicated by step 3A.

As represented by step 4 of FIG. 3, the wall members 32 and 36, and passage-forming support members 38 are assembled in close relation to produce the full preform 40 as set forth above with respect to FIG. 2. Such preform is a relatively solid structure with substantially limited edgeward contact between the wall members to provide the plurality of joints 42. Optionally, these members may be assembled after coating the appropriate exterior surfaces thereof with rubber cement or the like to produce a preform which can be subjected to additional handling with less chance of relative movement between the members during processing.

The fully assembled preform 40 is then placed in the die, not shown, and subjected to an initial hot-pressing operation as indicated in step 5 of FIG. 3. Preferably this is accomplished in a reducing or inert atmosphere within the die. With a relatively low pressure of approximately 500 psi applied, the binding ingredients in the wall members 32 and 36 and the binder in the passage-forming support members 38 decompose from the ceramic powder and filler powder respectively, and a portion thereof allowed to escape the die as the temperature within the die is raised above the volatilization point thereof to approximately 1200°F. Specifically, the EPDM rubber material present in each is substantially burned away, leaving a skeletal-like formation to support the wall members.

Without disturbing the initially hot-pressed preform 40 within the die, the pressure and temperature is increased to the required final firing hot-pressing conditions, as indicated in step 6 of FIG. 3, primarily to unify and densify the silicon nitride powder. Such pressure and temperature is in the range of 2000 to 2500 psi and 2500° to 2950°F., respectively, and preferably approximately 2250 psi and 2850°F. respectively, which conditions are maintained for a predetermined period of approximately four hours.

After the hot-pressing operation, designated as step 6 of FIG. 3, the ceramically fired heat exchanger 10 is removed from the die and the remainder of the decomposed filler material is cleaned out of the heat exchanger, as identified in step 7, to thereby provide the air passages 16 and 18, and gas passages 26 and 28 as best shown in FIG. 1. The decomposed filler material may be removed by additional air burnout of the graphite and/or by ultrasonic wash, for example, or could be chemically dissolved.

The process of the present invention thus permits densifying and joinably fabricating green ceramic wall members into a hot-pressed ceramic article with relatively thin walls and intricate internal passages. It produces an article with walls having a relatively high density of approximately 95 percent or more and relatively high strength. The removable filler material, and particularly the passage-forming support members 38 of the present invention, substantially eliminates the tendency of the article walls to sag prior to the heating and hardening stages. This contributes greatly to the formation of intricate internal passages in the fired article which are particularly useful in a heat exchanger or the like. Further, the support members allow the preform to be extensively handled without damage.

While the invention has been described and shown with particular reference to a preferred embodiment, it will be apparent that variations might be possible that would fall within the scope of the present invention, which is not intended to be limited except as defined in the following claims.

What is claimed is:

1. A method of manufacturing a ceramic open cellular article comprising,
   forming a ceramic based mixture into a plurality of sheets of wall forming members,
   independently forming a disintegratable filler mixture into a plurality of wall support members,
   then assembling said wall forming members and said support members in contiguous relation to provide a relatively solid structure with said wall forming members being disposed in edgeward contact with each other to form a plurality of joints therebetween,
   subsequently heating said structure and permitting said support members to partially decompose while still bracing said wall forming members and causing said wall forming members to harden and said joints to fuse in a predetermined pattern, and
   removing the remainder of said decomposed support members to provide a plurality of accurately-shaped openings in the ceramic article.

2. The method of manufacturing a ceramic article of claim 1 including subjecting the heated structure to pressure during said heating procedure for increasing the density and strength of said wall forming members and said joints.

3. The method of manufacturing a ceramic article of claim 2 wherein said ceramic based mixture is prepared by blending a quantity of ceramic particles selected from the group consisting of refractory nitrides, refractory carbides and refractory oxides, with a plurality of binding ingredients including elastomeric materials for attaining optimum handling properties in the article prior to heating.

4. The method of manufacturing a ceramic article of claim 3 wherein said quantity of ceramic particles includes relatively high alpha phase silicon nitride particles.

5. The method of manufacturing a ceramic article of claim 4 wherein the preferred temperature and pressure range required for a final hot-pressing condition is from 2500° to 2950°F. and 2000 to 2500 psi, respectively.

6. The method of manufacturing a ceramic article of claim 1 wherein said disintegratable filler mixture is prepared by blending a relatively inert filler material with a binder including elastomeric materials so as to minimize any chemical reaction with said ceramic based mixture.

7. The method of manufacturing a ceramic article of claim 6 wherein said relatively inert filler material includes graphite and said elastomeric materials include EPDM rubber.

8. A method of manufacturing a ceramic open cellular heat exchanger comprising,
   forming a ceramic based mixture including a blend of a quantity of ceramic particles selected from the group consisting of refractory nitrides, refractory carbides, and refractory oxides with a quantity of binding ingredients into a plurality of substantially flat wall members,
   separately forming an expendable mixture including a blend of a quantity of relatively inert particles and a quantity of binding elastomeric materials into a plurality of wall support members,
   then assembling said wall members and said support members in closely adjacent proximity to provide a substantially solid structure with said wall members being disposed in edgeward contact with each other to form a plurality of joints therebetween,
   subjecting said structure to an initial heating and pressurizing stage in a die at approximately 1200°F. and 500 psi, respectively, so that said elastomeric materials of said support members are substantially removed by decomposition leaving a formation holding said wall members in the desired assembly, subjecting said structure to a higher heating and pressurizing stage at approximately 2850°F. and 2250 psi so that said wall members are densified and hardened and said joints are fused in a predetermined pattern, and removing the remainder of said partially decomposed support members to provide a plurality of accurately shaped openings in the ceramic article.

9. The method of manufacturing a ceramic open cellular heat exchanger of claim 8 wherein said ceramic based mixture includes a blend of a quantity of silicon nitride particles and a relatively small quantity of magnesium oxide particles as a catalyst with a quantity of EPDM rubber binding ingredients.

10. The method of manufacturing a ceramic open cellular heat exchanger of claim 9 wherein said ceramic based mixture includes blending said silicon nitride particles and said magnesium oxide particles with said EPDM rubber binding ingredients at a 55 percent to 45 percent volumetric ratio.

11. The method of manufacturing a ceramic open cellular heat exchanger of claim 8 wherein said expendable mixture includes a blend of a quantity of graphite particles and a quantity of EPDM rubber materials.

12. The method of manufacturing a ceramic open cellular heat exchanger of claim 11 wherein said expendable mixture includes blending said graphite particles with said EPDM rubber materials at a 55 percent to 45 percent volumetric ratio.

13. A method of manufacturing an open cellular article comprising;

forming a relatively weak bondable material into a plurality of wall forming members, independently forming a disintegratable filler material into a plurality of wall support members, assembling said wall forming members and said support members in contiguously associated relation to provide a relatively solid structure with said support members serving to maintain said wall forming members in predetermined precise positions, heating said structure and permitting said support members to partially decompose while still bracing said wall forming members and causing said wall forming members to harden and bond to each other to provide a substantially rigid monolithic unit, and removing the remainder of said support members to provide a plurality of accurately-shaped openings in the article.

14. The method of manufacturing an open cellular article of claim 13 including the step of subjecting said structure to pressure during the heating procedure for increasing the density and strength of said wall forming members.

15. The method of manufacturing an open cellular article of claim 14 wherein said weak bondable material includes a plurality of binding ingredients including elastomeric materials and said disintegratable filler material includes a binder including elastomeric materials for improved forming and initial handling thereof.

* * * * *